United States Patent
Simske et al.

(10) Patent No.: US 10,678,903 B2
(45) Date of Patent: Jun. 9, 2020

(54) AUTHENTICATION USING SEQUENCE OF IMAGES

(71) Applicant: Hewlett-Packard Development Company, L.P., Houston, TX (US)

(72) Inventors: Steven J. Simske, Fort Collins, CO (US); Tong Zhang, San Jose, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

(21) Appl. No.: 16/072,281

(22) PCT Filed: May 2, 2016

(86) PCT No.: PCT/US2016/030359
§ 371 (c)(1),
(2) Date: Jul. 24, 2018

(87) PCT Pub. No.: WO2017/192116
PCT Pub. Date: Nov. 9, 2017

(65) Prior Publication Data
US 2019/0034615 A1    Jan. 31, 2019

(51) Int. Cl.
*H04L 29/06* (2006.01)
*G06F 21/36* (2013.01)
(Continued)

(52) U.S. Cl.
CPC .............. *G06F 21/36* (2013.01); *G06F 21/35* (2013.01); *G06F 21/45* (2013.01); *H04L 9/3226* (2013.01)

(58) Field of Classification Search
CPC .......... G06F 21/36; G06F 21/35; G06F 21/45; H04L 9/3226
See application file for complete search history.

(56) References Cited

U.S. PATENT DOCUMENTS

| 6,118,872 A | 9/2000 | Kashima |
| 8,392,975 B1 | 3/2013 | Raghunath |

(Continued)

FOREIGN PATENT DOCUMENTS

| WO | WO-2006057475 A1 | 6/2006 |
| WO | WO-2014182957 A1 | 11/2014 |

OTHER PUBLICATIONS

Almuairfi, Sadiq et al, "A novel image-based implicit password authentication system (IPAS) for mobile and non-mobile devices", Mathematical and Computer Modelling, Pergamon Press, Oxford, GB, vol. 58, No. 1, Jul. 16, 2012.

(Continued)

*Primary Examiner* — Ghodrat Jamshidi
(74) *Attorney, Agent, or Firm* — HP Inc. Patent Department

(57) ABSTRACT

Example implementations relate to authentication using a sequence of images. For example, a computing device may include an input device to receive data from a user and a processor in communication with the input device. The processor provides a request for a private key associated with the user, where the request includes a public key specifying a set of categories each relating to an object. The processor receives, via the input device, the private key in response to the request, where the private key includes a sequence of images based on the public key. The processor authenticates the user when each image in the sequence of images is associated with a particular object previously assigned to the user based on the set of categories.

15 Claims, 3 Drawing Sheets

(51) Int. Cl.
  *G06F 21/45* (2013.01)
  *H04L 9/32* (2006.01)
  *G06F 21/35* (2013.01)

(56) References Cited

U.S. PATENT DOCUMENTS

| | | | |
|---|---|---|---|
| 9,082,235 B2 | 7/2015 | Lau et al. | |
| 9,710,633 B2* | 7/2017 | Lee | G06F 21/36 |
| 10,321,310 B1* | 6/2019 | Scheer | H04W 12/06 |
| 2003/0053662 A1 | 3/2003 | Evoy et al. | |
| 2004/0230843 A1 | 11/2004 | Jansen | |
| 2005/0212758 A1* | 9/2005 | Marvit | G06F 1/1694 |
| | | | 345/156 |
| 2007/0253592 A1 | 11/2007 | Sun et al. | |
| 2008/0016358 A1 | 1/2008 | Filreis et al. | |
| 2013/0031623 A1 | 1/2013 | Sanders | |
| 2013/0346740 A1 | 12/2013 | Mirashrafi | |
| 2014/0049653 A1 | 2/2014 | Leonard et al. | |
| 2014/0089658 A1* | 3/2014 | Raghuram | H04L 9/0825 |
| | | | 713/155 |
| 2014/0230024 A1* | 8/2014 | Uehara | H04L 63/1433 |
| | | | 726/4 |
| 2014/0372754 A1 | 12/2014 | Aissi | |
| 2015/0012742 A1* | 1/2015 | Gorelik | H04L 63/0861 |
| | | | 713/155 |
| 2015/0104012 A1* | 4/2015 | Holman | H04N 1/4486 |
| | | | 380/243 |
| 2016/0034682 A1* | 2/2016 | Fiske | H04L 63/08 |
| | | | 726/19 |
| 2016/0125416 A1* | 5/2016 | Spencer | G06Q 20/1085 |
| | | | 705/71 |
| 2017/0132633 A1* | 5/2017 | Whitehouse | G06Q 20/3274 |
| 2017/0140346 A1* | 5/2017 | Whitehouse | G06Q 20/3274 |

OTHER PUBLICATIONS

Fathy M. et al. "Face-based Active Authentication on Mobile Devices"; Apr. 19-24, 2015; http://ieeexplore.ieee.org/stamp/stamp.jsp?arnumber=7178258.

* cited by examiner

AUTHENTICATION USING SEQUENCE OF IMAGES

BACKGROUND

Identity authentication has become prevalent, from banking services to online transactions. For example, at the point of sale (POS), a person typically must prove their identity in order to make a purchase with a financial card.

BRIEF DESCRIPTION OF THE DRAWINGS

Some examples of the present application are described with respect to the following figures.

DETAILED DESCRIPTION

Figure 1:
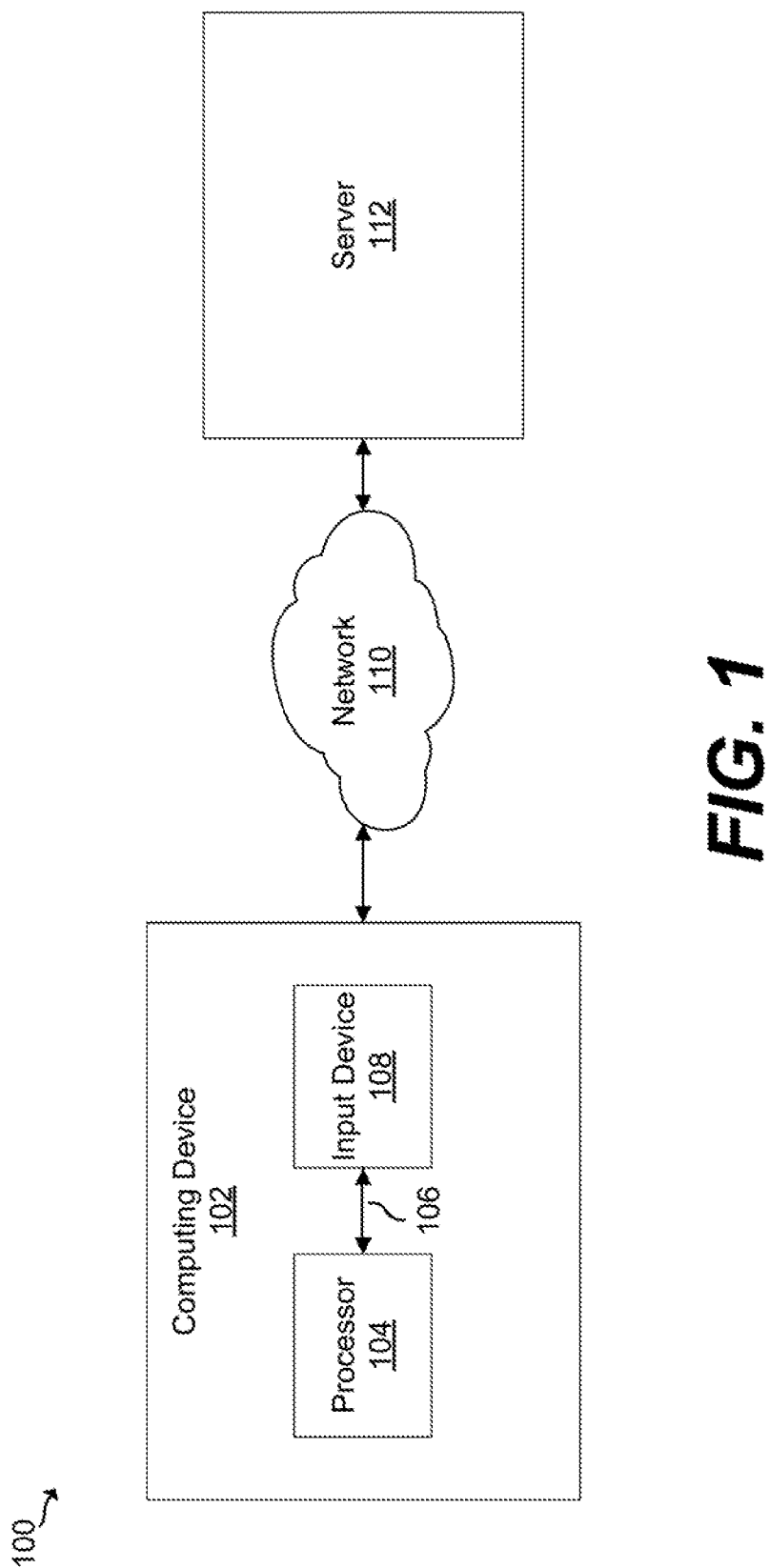
FIG. 1 illustrates an example system having a computing device in communication with a server.

As described above, identity authentication has become prevalent, especially given the ever-increasing frequency of identity theft, password hacking, and database breaches. As such, examples discussed herein may authenticate a user's identity using a sequence of images. The sequence of images may act functionally as a private key associated with a user such that when the user provides their sequence of images, the user's identity may be authenticated.

For example, when a user is to be authenticated, a computing device may request a private key from the user, where the private key may be a sequence of images associated with the user. The request may provide a public key that specifies a specific sequence of categories each relating to an object, and the private key that is to be supplied by the user may be based on selecting from each of the categories provided. For example, a computing device may request that the user provide their private key that relates to a public key specifying a dog, a bridge, and a building. In response, the user may provide their private key, where their private key may include an image of a golden retriever, an image of the Golden Gate Bridge, and an image of the Empire State Building. The computing device may read each image in the sequence of images, conduct image processing to extract information associated with each image, and generate a private key associated with the image sequence. If the generated private key matches the user's private key stored in a database, the user's identity may be authenticated. For example, the computing device may extract information associated with each image in the sequence of images and compare the information to stored information associated with the user. If the extracted information matches the stored information, the user may be authenticated. In some examples, if the extracted information matches the stored information, the computing device itself may be authenticated.

A user may be associated with a sequence of images in any suitable manner. For example, when a user sets up an authentication process for an account, the user may be prompted to select a set of images to be associated with and/or assigned to the user, or the user may be designated the set of images to be associated with and/or assigned to the user. The user may then use the sequence of images to authenticate the user's identity when the user is attempting to perform an action relating to the user's account.

In some examples, the sequence of images may be individual images or frames of a video. For example, the user may present a video in response to the request for the user's private key, and the computing device may process any of the frames in the video in order to determine whether the video matches the user's private key. In some examples, the computing device may read the video but not process every frame of the video. Instead, the computing device may process every N frames, where N is any suitable number of frame increments to process. For example, the computing device may process every fourth frame in the video by recognizing content and extracting image features in those frames.

A public key associated with a private key assigned to a user may be obtained by recognizing objects in the private key. For example, a user may provide a sequence of images that includes an image of a golden retriever, an image of the Golden Gate Bridge, and an image of the Empire State Building, and the computing device may recognize an object in each image (e.g., a dog, a bridge, and a building). As such, the category of each of these objects may be provided as the public key. In some examples, each image may contain only one dominant object (e.g., the object occupies the majority of the space in the image), and that dominant object may be recognized such that its associated category would become part of the public key. In other examples, an image in the sequence of images may include more than one object, and only the category of an object that exists in an associated dictionary of categories may become part of the public key, or only the category of the largest object in the image would be chosen to become part of the public key.

Objects may be detected using any suitable object detection techniques (e.g., a face detector, a classifier, etc.). To recognize and derive the category associated with an object, any suitable image classification techniques may be used. For example, supervised classification models such as deep neural networks, support vector machines, random forest, Bayesian networks, and the like may be trained with categorized samples of a large number of object categories to obtain the capability of distinguishing among these categories of objects. In some examples, sample images of the objects may be preprocessed before being fed to the classifiers, such as normalization in size and illumination, down sampling, feature computation (e.g., color, shape, texture features, etc.). In some examples, a special-purpose classifier for particular objects may be used, such as a face-recognition engine.

Referring now to the figures, FIG. 1 illustrates an example system 100 having a computing device 102 in communication with a server 112. The computing device 102 may be any suitable computing device that includes any suitable processor 104 in communication with an input device 108 via a connection 106 (e.g., a wired or wireless connection). The input device 108 may be any suitable input device to receive data from a user. For example, the input device 108 may be a camera or a scanner to receive a sequence of images in any suitable manner. In some examples, the sequence of images may be received by the input device 108 via a mobile device of the user (e.g., a phone, a tablet, a laptop, etc.). For example, the user may present the sequence of images on their mobile device, and the input device 108 may input the sequence of images to the computing device 102.

The processor 104 may be any suitable processor to authenticate the identity of the user. For example, the processor 104 may provide a request for a private key associated with the user, where the request may include a public key specifying a set of categories each relating to an object. The processor 104 may receive, via the input device 108, the private key in response to the request, where the private key may include a sequence of images based on the public key. The processor 104 may authenticate the user when each image in the sequence of images is associated with a particular object previously assigned to the user based on the set of categories. When a user is authenticated, the processor 104 may allow access to content associated with the computing device 102.

The computing device 102 may be in communication with a server 112 over a network 110, which may be any suitable network, such as an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks. The server 112 may be any suitable server to receive data from and/or provide data to the computing device 102. For example, the server 112 may provide authentication information to the computing device 102, where the authentication information may include any suitable information associated with authentication, such as a stored private key associated with the user. However, in some examples, the server 112 may not be needed in the authentication process, as the computing device 102 may perform the operations of the server 112.

Figure 2:
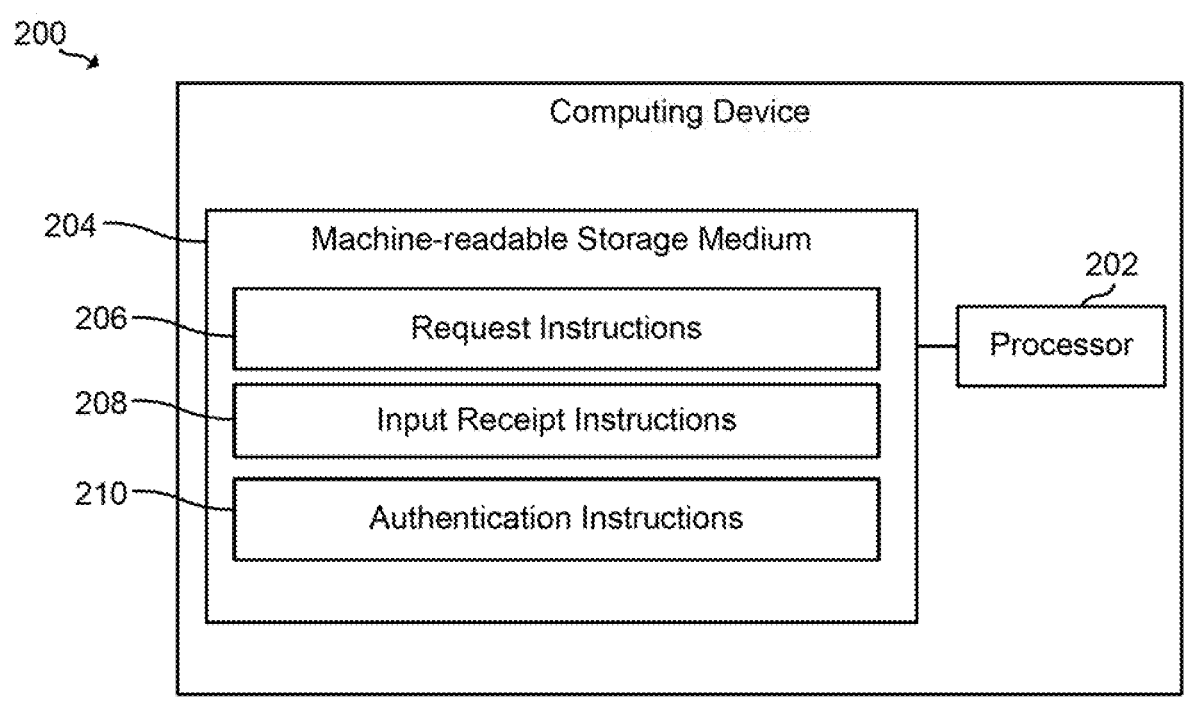
FIG. 2 is a block diagram of an example computing device for authenticating a user using a sequence of images.

FIG. 2 is a block diagram of an example computing device 200 for authenticating a user using a sequence of images. Computing device 200 may be similar to the computing device 102 of FIG. 1 and may be any suitable computing device to receive the sequence of images that may be used to authenticate a user.

Computing device 200 may be, for example, a web-based server, a local area network server, a cloud-based server, a notebook computer, a desktop computer, an all-in-one system, a tablet computing device, a mobile phone, an electronic book reader, a printing device, a kiosk, a point-of-sale device, or any other electronic device suitable for authenticating a user using a sequence of images. Computing device 200 may include a processor 202 and a machine-readable storage medium 204. Computing device 200 may allow the authentication of a user's identity using a sequence of images provided by the user.

Processor 202 is a tangible hardware component that may be a CPU, a semiconductor-based microprocessor, and/or other hardware devices suitable for retrieval and execution of instructions stored in machine-readable storage medium 204. Processor 202 may fetch, decode, and execute instructions 206, 208, and 210 to control a process of authenticating a user using a sequence of images. As an alternative or in addition to retrieving and executing instructions, processor 202 may include at least one electronic circuit that includes electronic components for performing the functionality of instructions 206, 208, 210, or a combination thereof.

Machine-readable storage medium 204 may be any electronic, magnetic, optical, or other physical storage device that contains or stores executable instructions. Thus, machine-readable storage medium 204 may be, for example, Random Access Memory (RAM), an EPROM, an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, and 210 for providing a request for a private key associated with a user, where the request includes a public key specifying a set of categories each relating to an object; reading the private key presented by the user in response to the request, where the private key includes a sequence of images based on the public key; determining whether each image in the sequence of images is associated with a particular object previously assigned to the user based on the set of categories; and authenticating the user when each image is associated with the particular object previously assigned to the user.

Request instructions 206 may manage and control the providing of a request for a private key to a user. The request instructions 206 may generate a request that includes a public key specifying a set of categories each relating to an object and may provide the request to a user in any suitable manner.

Input receipt instructions 208 may manage and control the receipt and reading of a private key presented by the user in response to the request. The private key presented by the user may be a sequence of images (e.g., individual images, frames of a video, etc.) that are based on the public key. For example, the public key may specify a set of categories, and the private key presented by the user may include an image based on each category specified. The input receipt instructions 208 may also manage and control the determination of whether each image received in the sequence of images is associated with a particular object previously assigned to the user based on the set of categories. For example, the input receipt instructions 208 may read each image in the sequence of images, conduct image processing to extract information associated with each image, generate a private key associated with the image sequence, and compare the generated private key with the user's private key stored in a database of the computing device 200, where the private key that is stored in the database is based on objects previously assigned to the user.

Figure 3:
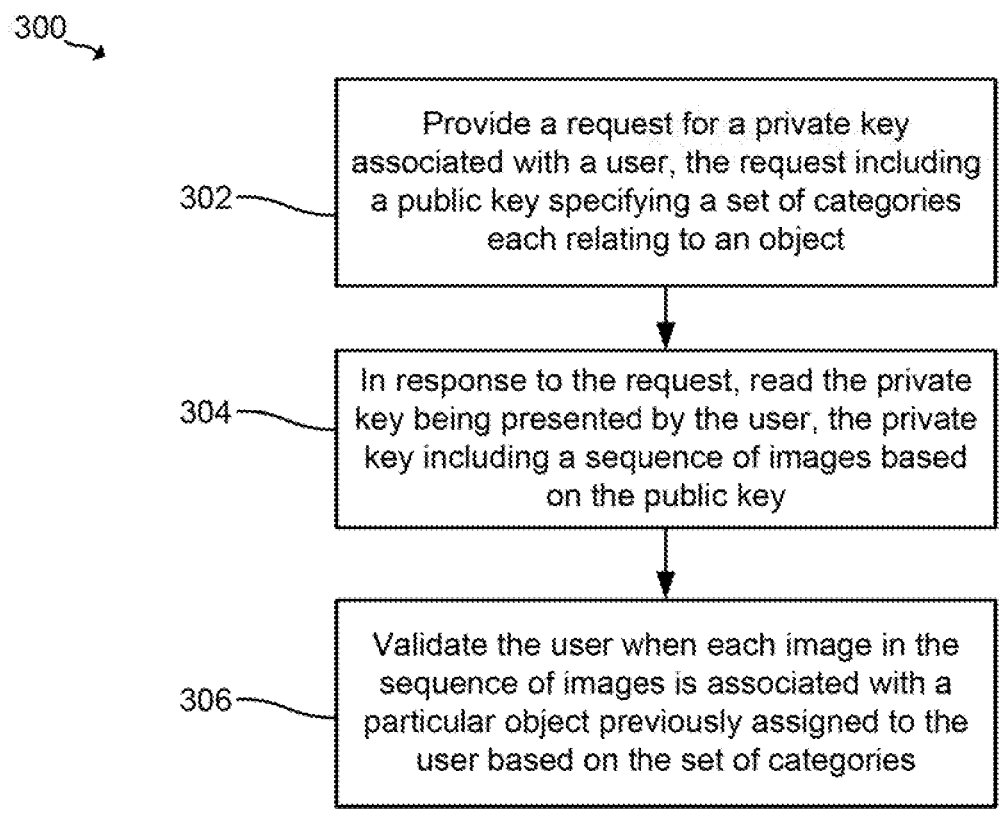
FIG. 3 is a flowchart of an example method for authenticating a user using a sequence of images.

Authentication instructions 210 may manage and control the authentication of the user when each image in the sequence of images is associated with the particular object previously assigned to the user. For example, when the private key generated based on the sequence of images received by the user matches the private key stored in the database of the computing device 200, the user may be authenticated. In some examples, the private key generated may be hashed before matching with a hashed version of the stored private key FIG. 3 is a flowchart of an example method 300 for authenticating a user using a sequence of images. Method 300 may be implemented using computing device 200 of FIG. 2.

Method 300 includes, at 302, providing a request for a private key associated with a user, the request including a public key specifying a set of categories each relating to an object. For example, the request may specify categories that include a dog, a bridge, and a building.

Method 300 also includes, at 304, in response to the request, reading the private key being presented by the user, the private key including a sequence of images based on the public key. For example, the user may present an image of a golden retriever, an image of the Golden Gate Bridge, and an image of the Empire State Building, and these images may be read by the computing device (e.g., computing device 200 of FIG. 2).

Method 300 also includes, at 306, validating the user when each image in the sequence of images is associated with a particular object previously assigned to the user based on the set of categories. For example, if the user's private key is associated with an image of a golden retriever, an image of the Golden Gate Bridge, and an image of the Empire State Building, the user's identity may be authenticated.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device, comprising:
   an input device to receive data from a user; and
   a processor in communication with the input device, the processor to:
      provide a request for a private key associated with the user, wherein the request includes a public key specifying a set of categories each relating to an object;
      receive, via the input device, the private key in response to the request, wherein the private key includes a sequence of images based on the public key; and
      authenticate the user when each image in the sequence of images is associated with a particular object previously assigned to the user based on the set of categories.

2. The computing device of claim 1, wherein the processor is further to:
   extract information associated with each image in the sequence of images; and
   compare the information to stored information associated with the user, wherein the user is authenticated when the information matches the stored information.

3. The computing device of claim 1, wherein the sequence of images includes individual images or frames of a video.

4. The computing device of claim 1, wherein the input device is a camera or a scanner.

5. The computing device of claim 1, wherein the images in the sequence of images are received via a mobile device of the user.

6. A method, comprising:
   providing, by a computing device, a request for a private key associated with a user, the request including a public key specifying a set of categories each relating to an object;
   in response to the request, reading, by the computing device, the private key being presented by the user, the private key including a sequence of images based on the public key; and
   validating, by the computing device, the user when each image in the sequence of images is associated with a particular object previously assigned to the user based on the set of categories.

7. The method of claim 6, further comprising:
   extracting, by the computing device, information associated with each image in the sequence of images; and
   comparing, by the computing device, the information to stored information associated with the user, wherein the user is validated when the information matches the stored information.

8. The method of claim 6, wherein the sequence of images includes individual images or frames of a video.

9. The method of claim 6, wherein the private key is read via a camera or a scanner of the computing device.

10. The method of claim 6, wherein the images in the sequence of images are presented via a mobile device of the user.

11. A non-transitory machine-readable storage medium storing instructions that, when executed by a processor of a computing device, cause the computing device to:
   provide a request for a private key associated with a user, wherein the request includes a public key specifying a set of categories each relating to an object;
   read the private key presented by the user in response to the request, wherein the private key includes a sequence of images based on the public key;
   determine whether each image in the sequence of images is associated with a particular object previously assigned to the user based on the set of categories; and
   authenticate the user when each image is associated with the particular object previously assigned to the user.

12. The non-transitory machine-readable storage medium of claim 11, wherein the instructions further cause the computing device to:
   extract information associated with each image in the sequence of images; and
   compare the information to stored information associated with the user, wherein the user is authenticated when the information matches the stored information.

13. The non-transitory machine-readable storage medium of claim 11, wherein the sequence of images includes individual images or frames of a video.

14. The non-transitory machine-readable storage medium of claim 11, wherein the private key is read via a camera or a scanner of the computing device.

15. The non-transitory machine-readable storage medium of claim 11, wherein the instructions further cause the computing device to authenticate the computing device when each image is associated with the particular object previously assigned to the user.

\* \* \* \* \*